(12) United States Patent
Watanabe et al.

(10) Patent No.: US 7,812,580 B2
(45) Date of Patent: Oct. 12, 2010

(54) POWER SUPPLY APPARATUS HAVING SWITCHABLE SWITCHING REGULATOR AND LINEAR REGULATOR

(75) Inventors: Hiroyuki Watanabe, Shizuoka (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 414 days.

(21) Appl. No.: 11/912,528

(22) PCT Filed: May 25, 2006

(86) PCT No.: PCT/JP2006/310457

§ 371 (c)(1),
(2), (4) Date: Oct. 25, 2007

(87) PCT Pub. No.: WO2006/126639

PCT Pub. Date: Nov. 30, 2006

(65) Prior Publication Data

US 2009/0072626 A1    Mar. 19, 2009

(30) Foreign Application Priority Data

May 26, 2005  (JP) .............................. 2005-154238

(51) Int. Cl.
G05F 1/59  (2006.01)
(52) U.S. Cl. .................. 323/268; 323/274; 323/284
(58) Field of Classification Search ................ 323/268, 323/274, 284
See application file for complete search history.

(56) References Cited

U.S. PATENT DOCUMENTS

| 4,502,152 | A | * | 2/1985 | Sinclair | 455/73 |
| 5,034,676 | A | * | 7/1991 | Kinzalow | 323/268 |
| 5,083,078 | A | * | 1/1992 | Kubler et al. | 323/268 |
| 6,424,128 | B1 | * | 7/2002 | Hiraki et al. | 323/268 |

(Continued)

FOREIGN PATENT DOCUMENTS

JP    2002-136120    5/2002

(Continued)

OTHER PUBLICATIONS

International Preliminary Report on Patentability for International Application No. PCT/JP2006/310457 dated Nov. 29, 2007.

(Continued)

Primary Examiner—Jeffrey L Sterrett
(74) Attorney, Agent, or Firm—Cantor Colburn LLP

(57) ABSTRACT

A control circuit is provided in which two power sources can be efficiently switched, for a power supply apparatus provided with a step down switching regulator and a linear regulator. A PWM controller generates a pulse width modulation signal with which a duty ratio is controlled so that output voltage of the switching regulator approaches a predetermined reference voltage. A compulsory OFF circuit monitors a switching voltage, and when a first threshold voltage is exceeded, switches a synchronous rectifier transistor OFF. A minimum ON time setting circuit limits the duty ratio of the pulse width modulation signal, so that ON time of the switching transistor is longer than a predetermined minimum value. A selector circuit monitors an error voltage, and when a predetermined state continues for a predetermined first period, puts the linear regulator in an operating state, and the step down switching regulator in a halt state.

11 Claims, 11 Drawing Sheets

U.S. PATENT DOCUMENTS

| | | | |
|---|---|---|---|
| 6,636,023 B1* | 10/2003 | Amin | 323/268 |
| 6,661,210 B2* | 12/2003 | Kimball et al. | 323/268 |
| 6,661,211 B1* | 12/2003 | Currelly et al. | 323/268 |
| 6,815,935 B2* | 11/2004 | Fujii | 323/272 |
| 7,129,681 B2* | 10/2006 | Fujii | 323/268 |
| 7,292,015 B2* | 11/2007 | Oswald et al. | 323/268 |
| 7,397,151 B2* | 7/2008 | Ishino | 307/150 |
| 7,508,176 B2* | 3/2009 | Hartular et al. | 323/268 |
| 7,508,177 B2* | 3/2009 | Aiura et al. | 323/268 |
| 2002/0089316 A1* | 7/2002 | Liu | 323/268 |
| 2002/0167827 A1* | 11/2002 | Umeda et al. | 363/59 |

FOREIGN PATENT DOCUMENTS

| | | |
|---|---|---|
| JP | 2002-252971 | 9/2002 |
| JP | 2002-369505 | 12/2002 |
| JP | 2003-108244 | 4/2003 |
| JP | 2003-216247 | 7/2003 |
| JP | 2004-32875 | 1/2004 |
| JP | 2004-56982 | 2/2004 |
| JP | 2004-70827 | 3/2004 |
| JP | 2004-320893 | 11/2004 |

OTHER PUBLICATIONS

International Search Report for International Application No. PCT/JP2006/310457 mailed Aug. 22, 2006.

* cited by examiner

US 7,812,580 B2

POWER SUPPLY APPARATUS HAVING SWITCHABLE SWITCHING REGULATOR AND LINEAR REGULATOR

CROSS REFERENCE TO RELATED APPLICATIONS

This is a U.S. national stage of application No. PCT/JP2006/310457, filed on 25 May 2006. Priority under 35 U.S.C. §119(a) and 35 U.S.C. §365(b) is claimed from Japanese Application No. 2005-154238, filed 26 May 2005, the disclosure of which is also incorporated herein by reference.

BACKGROUND OF THE INVENTION

1. Field of the Invention

The present invention relates to a power supply apparatus provided with a step down switching regulator and a linear regulator, and in particular to control technology for switching the switching regulator and the linear regulator.

2. Description of the Related Art

In recent years, microcomputers for performing digital signal processing are being installed in various electronic devices, such as mobile telephones, PDAs (Personal Digital Assistants), laptop personal computers, and the like. Power supply voltage necessary for driving these microcomputers decreases as semiconductor manufacturing processes become more refined, and there are devices that operate at low voltages of 1.5 volts or below.

Furthermore, lithium-ion batteries or the like are installed as power sources in these electronic devices. The voltage outputted from lithium-ion batteries is approximately 3 to 4 volts, and since electrical power consumption is wasted in supplying the voltage at this rate to the microcomputer, in general, battery voltage is stepped down using a step down type of switching regulator, a series regulator, or the like, and the voltage is made constant, to be supplied to the microcomputer.

With regard to the step down switching regulator, there is a type that uses a diode for rectification (referred to below as a diode rectifier type), and a type that, instead of the diode, uses a synchronous rectifier transistor (referred to below as a synchronous rectification type). The former has an advantage in that high efficiency can be obtained when a load current flowing in a load is low, but since the diode is necessary, in addition to an inductor and an output capacitor at an outer portion of a control circuit, circuit area becomes large. With the latter, when current supplied to the load is small, efficiency is inferior compared to the former, but since the transistor is used instead of the diode, integration is possible inside an LSI, and circuit area including peripheral parts can be miniaturized. With regard to electronic devices such as mobile telephones and the like, in cases in which miniaturization is required, the switching regulator that uses a rectification transistor (referred to below as a synchronous rectification type of switching regulator) is often employed.

Here, consumed electrical current of the microcomputer used in the abovementioned electronic devices varies considerably at operating time and at standby time; only a little current is flowing at standby time, but some amount of current is necessary at operating time.

For example, Patent Documents 1 and 2 disclose a switching regulator for switching a synchronous rectification type and a diode rectifier type, according to the load current.

Patent Document 1: Japanese Patent Application, Laid Open No. 2004-32875

Patent Document 2: Japanese Patent Application, Laid Open No. 2002-252971

FIGS. 11A and 11B show a time waveform of electrical current for a heavy load and a light load of a synchronous rectification type switching regulator. In these figures, IL expresses current flowing in an inductor, Io expresses load current, and time average value of the current IL flowing in the inductor is the load current Io. As shown in FIG. 11A, since, when the load is heavy, the load current Io is large, the current IL flowing in the inductor continues to take a positive value. However, as shown in FIG. 11B, when the load current Io decreases when the load is light, the current IL flowing in the inductor is negative, as in the shaded areas, and the direction of the current IL flowing in the inductor is reversed. As a result, in the synchronous rectification type, when the load is light, the current flows from the inductor via the synchronous rectifier transistor to ground. This current is not supplied to the load, and since it is supplied from an output capacitor, electrical power is needlessly consumed.

In order to solve this problem, technology is known in which the current flowing in the inductor is monitored, and by compulsorily switching OFF the synchronous rectifier transistor when the direction of the current flowing in the inductor is reversed, the current is prevented from flowing to ground. Here, since a duty ratio of a pulse width modulation signal is determined as a ratio of ON time of a switching transistor and ON time of the synchronous rectifier transistor, the synchronous rectifier transistor is compulsorily switched off, and when this ON time becomes short, the ON time of the switching transistor also becomes short.

When the load is light, by the ON time of the switching transistor and the synchronous rectifier transistor being made short, consumed current of the switching regulator decreases; however, since current is consumed in a pulse width modulator or a driver circuit of the switching regulator, there is room for further lowering of consumed current. Here, since, in general, when output current is small, the efficiency of a linear regulator is higher than the efficiency of the switching regulator, the linear regulator and the switching regulator are arranged in parallel, and by switching the two when the load is light, efficiency can be further improved.

SUMMARY OF THE INVENTION

The present invention has been made in light of the these problems, and a general purpose is the provision of a control circuit in which two power sources can be efficiently switched, for a power supply apparatus provided with a step down switching regulator and a linear regulator.

An embodiment of the present invention relates to the control circuit of the power supply apparatus in which the step down switching regulator and the linear regulator can be switched. This control circuit is provided with: an output stage, including a switching transistor and a synchronous rectifier transistor connected in series between an input terminal and grounding, for outputting voltage at a connection point of the two transistors, as a switching voltage, to a switching regulator output circuit; a pulse width modulator for generating a pulse width modulation signal with which a duty ratio is controlled so that output voltage of the switching regulator output circuit approaches a predetermined reference voltage; a compulsory OFF circuit for monitoring the switching voltage, and switching OFF the synchronous rectifier transistor when the switching voltage exceed a first threshold voltage; a minimum ON time setting circuit for receiving the pulse width modulation signal, limiting the duty ratio of the pulse width modulation signal so that ON time of the switching transistor is longer than a predetermined minimum value; a driver circuit for generating a first and a second gate voltage to be applied to a gate terminal of the switching transistor and the synchronous rectifier transistor, based on an output signal of the minimum ON time setting circuit; and a selector circuit for monitoring an error voltage between the output voltage and the reference voltage, and when a predetermined state continues for a predetermined determination period, for putting the linear regulator in an operating state, and putting a step down switching regulator in a halt state.

When the load is light, the direction of the current flowing in the inductor is reversed, and when the switching voltage exceeds the first threshold voltage, the synchronous rectifier transistor is compulsorily switched OFF. Since the duty ratio of the pulse width modulation signal is determined by the ratio of the ON time of the switching transistor and the ON time of the synchronous rectifier transistor, when the synchronous rectifier transistor is compulsorily switched OFF and the ON time thereof is short, the ON time of the switching transistor also becomes short. When the load is light, if the ON time of the switching transistor is limited to the predetermined minimum value or greater, the output voltage increases, and the duty ratio of the pulse width modulation signal is 0. When the selector circuit detects that this state has continued for a predetermined determination period, a determination is made that the state is a long-term light load state, and the selector switches from the switching regulator to the linear regulator.

According to this embodiment, on the one hand, in a short-term light load state, high efficiency can be realized by a compulsory OFF circuit, and in a long-term light load state, efficiency of the power supply apparatus can be improved by halting the switching regulator and making only the linear regulator operate.

After a predetermined light-load transition period has elapsed, after putting the linear regulator in an operating state, the selector circuit may put the step down switching regulator in a halt state.

In such cases, since it is possible to prevent both the linear regulator and the step down switching regulator being OFF, the predetermined reference voltage can be stably supplied to the load circuit.

The predetermined state may be a state in which the error voltage is larger than a predetermined second threshold voltage. When the load is light, if the ON time of the switching transistor is limited by the minimum ON time setting circuit, the output voltage increases, and the error voltage with respect to the reference voltage becomes large. Consequently, by comparing the error voltage and the second threshold voltage, it is possible to judge the light load state.

The selector circuit may include a comparator for comparing the error voltage and the second threshold voltage, and a time measurement circuit for measuring time at which an output signal of the comparator has a predetermined level, and when the time measured by the time measurement circuit reaches the determination period, the linear regulator may be put into an operating state, and the step down switching regulator may be put into a halt state.

The time measurement circuit may include a digital filter in which the determination period is set as a time constant.

The selector circuit may be further provided with a current monitoring circuit that monitors output current of the linear regulator, and when the output current exceeds a predetermined threshold current, puts the step down switching regulator into an operating state, and also puts the linear regulator into a halt state.

By monitoring the output current of the linear regulator, since, when there is a transition from the light load state to the heavy load state, it is possible to switch immediately to the switching regulator, the load in the heavy load state can be prevented from being driven by the linear regulator, and it is possible to realize high efficiency.

After a predetermined heavy-load transition period has elapsed, after putting the step down switching regulator in an operating state, the current monitoring circuit may put the linear regulator in a halt state.

In such cases, in order to be able to prevent both the linear regulator and the step down switching regulator being OFF, the predetermined reference voltage can be stably supplied to the load.

The linear regulator may include an output transistor one end of which is connected to the input terminal, and the other end of which is connected to an end of the inductor, and an error amplifier, to which the output voltage and the reference voltage are inputted, and the output thereof is connected to a control terminal of the output transistor. The current monitoring circuit may include a sensing transistor connected commonly with the control terminal to the output transistor, a sensing resistor arranged on an electrical current path of the sensing transistor, and a comparator for comparing a voltage step-down of the sensing resistor and a predetermined third threshold voltage corresponding to the threshold current.

The control circuit may be integrated on a single semiconductor substrate.

Another embodiment of the present invention is a power supply apparatus. The power supply apparatus is provided with a switching regulator output circuit; and the abovementioned control circuit for supplying a switching voltage to the switching regulator output circuit, wherein output voltage of the switching regulator output circuit and output voltage of the linear regulator are switched and outputted. The switching regulator output circuit includes an output capacitor and an inductor, one end of the output capacitor being grounded, and one end of the inductor being connected to the other end of the output capacitor.

According to this embodiment, by preferably switching, in accordance with load state, the output voltage of the switching regulator and the linear regulator, by the control circuit, it is possible to reduce consumed current of the entire electrical power unit.

An additional embodiment of the present invention is an electronic device. The electronic device is provided with a battery for outputting a battery voltage, a microcomputer, and the abovementioned electrical power unit for stepping down the battery voltage and supplying the microcomputer.

According to this embodiment, since the step down switching regulator and the linear regulator can be preferably switched, when the current flowing in the microcomputer varies, it is possible to realize long life for the battery.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
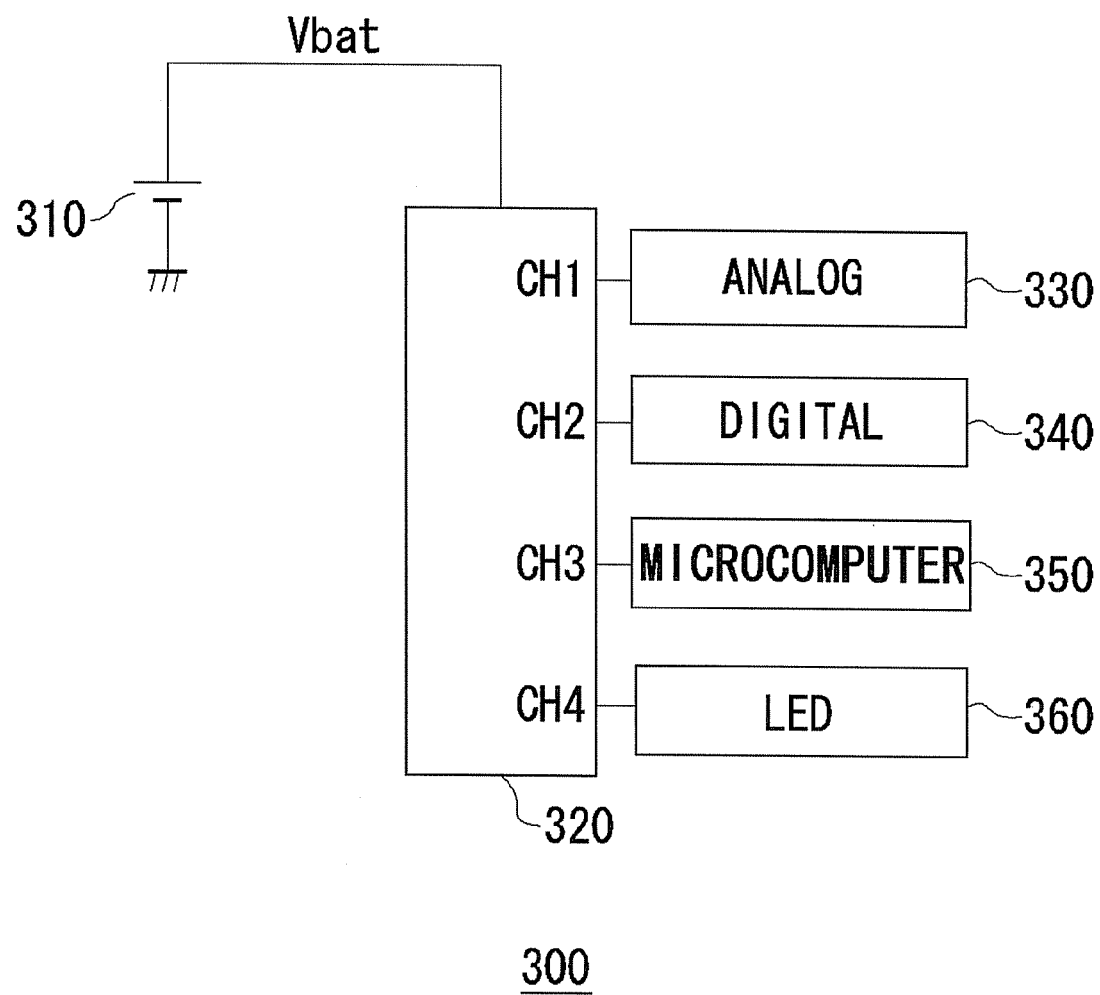
FIG. 1 is a block diagram showing a configuration of an electronic device in which a step down switching regulator according to an embodiment is installed.

The invention will now be described based on preferred embodiments which do not intend to limit the scope of the present invention but exemplify the invention. All of the features and the combinations thereof described in the embodiment are not necessarily essential to the invention.

Below, the present invention will be explaining based on a preferred embodiment, referring to the drawings. Similar or equivalent component elements, members, and processes shown in respective figures are given the same reference symbols, and repeated explanations are omitted as appropriate. Furthermore, the embodiments are examples that do not limit the invention, and all of the features and combinations thereof, described in the embodiments, are not necessarily essential items of the invention.

FIG. 1 is a block diagram showing a configuration of an electronic device in which a step down switching regulator according to the present embodiment is installed. The electronic device 300 is, for example, a mobile telephone, and includes a battery 310, a power supply apparatus 320, an analog circuit 330, a digital circuit 340, a microcomputer 350, and a LED 360.

The battery 310 is, for example, a lithium-ion battery, and outputs 3 to 4 volts as a battery voltage Vbat.

The analog circuit 330 includes a power amplifier, an antenna switch, a LNA (Low Noise Amplifier), and a high frequency circuit such as a mixer, a PLL (Phase Locked Loop), or the like, and includes a circuit block that stably operates with a power supply voltage Vcc=3.4 volts, approximately. In addition, the digital circuit 340 includes various types of DSP (Digital Signal Processor) and the like, and includes a circuit block that stably operates with a power supply voltage Vdd=3.4 volts, approximately.

The microcomputer 350 is a block for overall control of the entire electronic device 300, and operates at a power supply voltage of 1.5 volts.

The LED 360 includes a 3 color RGB LED (Light Emitting Diode), and is used as a liquid crystal back light or illumination, with a drive voltage of 4 volts or greater being required to drive the LED.

The power supply apparatus 320 is a multi-channel switching power supply, and is provided with a switching regulator for stepping down or stepping up the battery voltage Vbat, as required, for each respective channel. The power supply apparatus 320 supplies an appropriate power supply voltage to the analog circuit 330, the digital circuit 340, the microcomputer 350, and the LED 360.

The power supply apparatus of the present embodiment can be preferably used to drive a stable voltage for a load in which consumed current changes according to operating state, as, for example, for the microcomputer 350 operating at 1.5 volts. Below, a detailed explanation is given concerning a configuration of the power supply apparatus according to the present embodiment.

Figure 2:
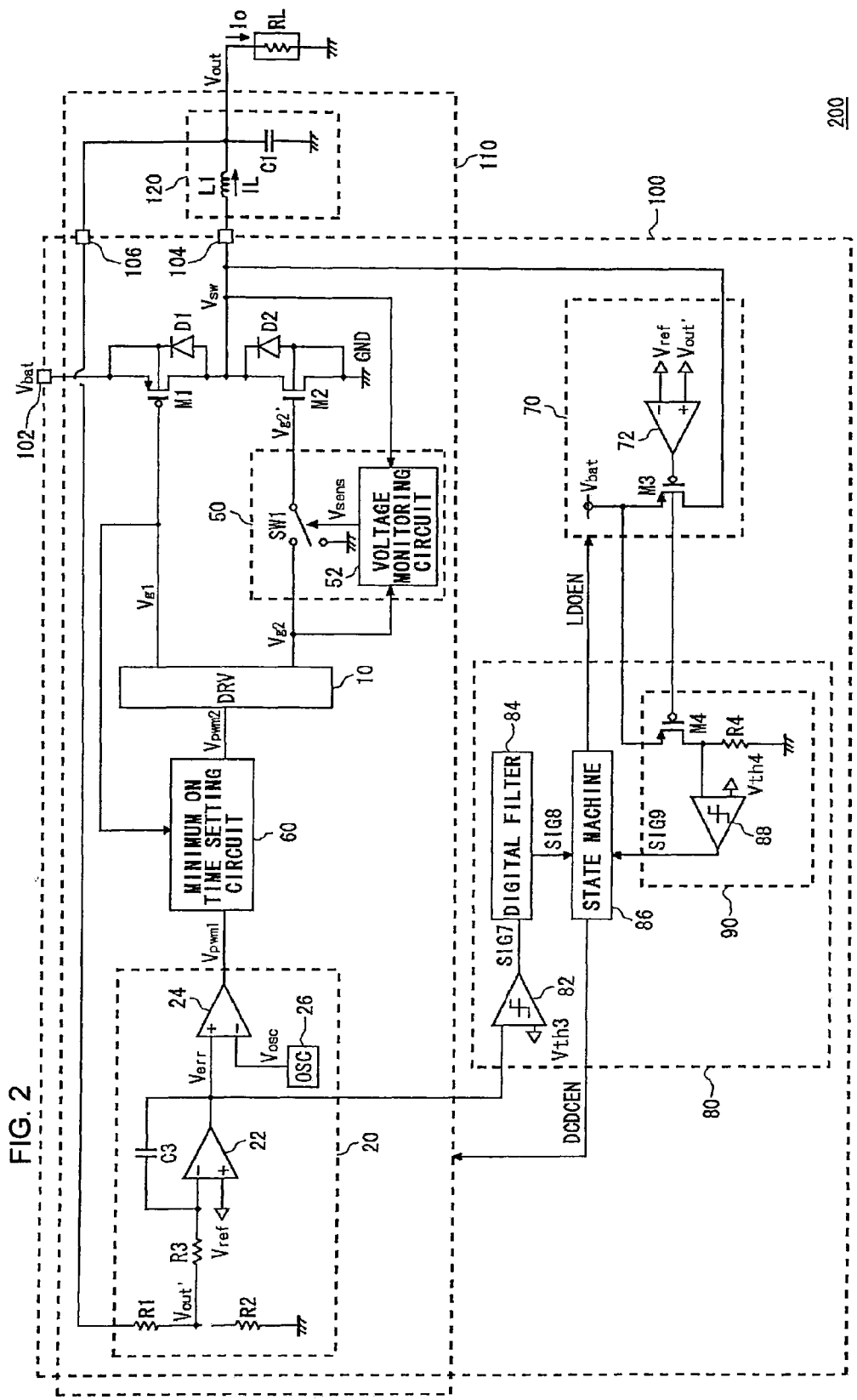
FIG. 2 is a circuit diagram showing a configuration of the power supply apparatus according to the embodiment.

FIG. 2. is a circuit diagram showing the configuration of the power supply apparatus 200 according to the embodiment. The power supply apparatus 200 includes a step down switching regulator 110 and a linear regulator 70, and the two can be switched.

The step down switching regulator 110 is a synchronous rectification type of step down switching regulator, and includes a control circuit 100 and a switching regulator output circuit 120. The control circuit 100 is a LSI chip integrated on a single semiconductor substrate, and a switching transistor M1 that functions as a switching element, and a synchronous rectifier transistor M2 are built-in, in this control circuit 100.

The switching regulator output circuit 120 includes an inductor L1 and an output capacitor C1. One end of the output capacitor C1 is grounded, and the other end is connected to one end of the inductor L1. The other end of the inductor L1 is connected to the control circuit 100, and a switching voltage Vsw outputted from the control circuit 100 is applied.

This step down switching regulator 110 controls current flowing in the inductor L1 by the control circuit 100, steps down the battery voltage Vbat by charging the output capacitor C1 with a charge, and supplies a voltage arising in the output capacitor C1 to a load circuit RL. In the present embodiment, the load circuit RL is equivalent to the microcomputer 350 of FIG. 1.

Below, voltage supplied to the load circuit RL is referred to as an output voltage Vout, current flowing in the load circuit RL is referred to as a load current Io, and current flowing in the inductor L1 is referred to as IL. Furthermore, the direction of flow of the current IL flowing in the inductor L1 towards the load circuit RL is the forward direction.

The control circuit 100 is provided with an input terminal 102, a switching terminal 104, and a voltage feedback terminal 106, as input and output terminals. The battery 310 is connected to the input terminal 102, and the battery voltage Vbat is inputted as the input voltage. Furthermore, the switching terminal 104 is connected to the inductor L1, and outputs the switching voltage Vsw generated inside the control circuit 100. In addition, the voltage feedback terminal 106 is a terminal to which the output voltage Vout, applied to the load circuit RL, is fed back.

The control circuit 100 includes a driver circuit 10, a PWM controller 20, a compulsory OFF circuit 50, a minimum ON time setting circuit 60, the linear regulator 70, a selector circuit 80, the switching transistor M1, and the synchronous rectifier transistor M2.

The switching transistor M1 is a P channel MOS transistor; a source terminal is connected to the input terminal 102; and a drain terminal is connected to the switching terminal 104. A back gate terminal of the switching transistor M1 is connected to the source terminal, and between the back gate terminal and the drain terminal there is a body diode (parasitic diode) D1.

The synchronous rectifier transistor M2 is an N channel MOS transistor; the source terminal is grounded, and the drain terminal is connected to the switching terminal 104 and the drain terminal of the switching transistor M1. Furthermore, a back gate terminal of the synchronous rectifier transistor M2 is grounded. Between the drain terminal and the back gate terminal of the synchronous rectifier transistor M2, there is a body diode D2.

The switching transistor M1 and the synchronous rectifier transistor M2 are connected in series between ground and the input terminal 102 to which the battery voltage Vbat is applied, and a voltage at a connection point of the two transistors is applied, as the switching voltage Vsw, to one end of the inductor L1 connected via the switching terminal 104 to an external part of the control circuit 100.

The PWM controller 20 is a pulse width modulator for controlling a duty ratio of ON time of the switching transistor M1 and the synchronous rectifier transistor M2, so that the output voltage Vout of the step down switching regulator 110 approaches a predetermined reference voltage, and the PWM controller 20 generates a first pulse width modulation signal (referred to below as a first PWM signal Vpwm1). The output voltage Vout of the step down switching regulator 110 is inputted via the voltage feedback terminal 106 to the PWM controller 20.

Resistors R1 and R2 divide the output voltage Vout, and output R2/(R1+R2) times the output voltage, namely Vout' to an inverting input terminal of an error amplifier 22. A reference voltage Vref is inputted to a non-inverting input terminal of the error amplifier 22, an error between the output voltage Vout' and the reference voltage Vref is amplified, and is outputted as an error voltage Verr. A resistor R3, a capacitor C3 and the error amplifier 22 make up an integrated circuit, and a high frequency component of the output voltage Vout' is removed by this integrated circuit.

An oscillator 26 oscillates at a predetermined frequency, and outputs a periodic voltage Vosc of a triangular waveform or a sawtooth waveform. A first comparator 24 compares the periodic voltage Vosc and the error voltage Verr, and outputs a first PWM signal Vpwm1 at a high level when Vosc<Verr, and at a low level when Vosc>Verr. This first PWM signal Vpwm1 is a signal whose pulse is modulated and in which periods at a high level and a low level change in accordance with the output voltage Vout', at a constant cycle time.

The minimum ON time setting circuit 60 outputs, to the driver circuit 10, a second PWM signal Vpwm2 that limits the duty ratio of the first PWM signal Vpwm1, so that the ON time of the switching transistor M1 becomes longer than a predetermined minimum value. When the high level time of the first PWM signal Vpwm1 is longer than the minimum value, the minimum ON time setting circuit 60 outputs the high level time as it is, and when the high level time of the first PWM signal Vpwm1 is shorter than the minimum value, the minimum ON time setting circuit 60 sets the high level time as the minimum value and outputs the high level time, as will be described below.

Based on the second PWM signal Vpwm2 outputted from the minimum ON time setting circuit 60, the driver circuit 10 generates a first gate voltage Vg1 to be applied to a gate terminal of the switching transistor M1, and a second gate voltage Vg2 to be applied to the gate terminal of the synchronous rectifier transistor M2. The switching transistor M1 is ON when the first gate voltage Vg1 has a low level, and is OFF when the first gate voltage Vg1 has a high level. The synchronous rectifier transistor M2 is ON when the second gate voltage Vg2 has a high level, and is OFF when the second gate voltage Vg2 has a low level.

The driver circuit 10 sets a ratio of respective times for which the switching transistor M1 and the synchronous rectifier transistor M2 are ON, based on the duty ratio of the high level and the low level of the second PWM signal Vpwm2, and alternately switches the two transistors ON and OFF. In order to prevent a penetration current from flowing when the switching transistor M1 and the synchronous rectifier transistor M2 are simultaneously ON, the driver circuit 10 sets, for each respective cycle, a period (deadtime) in which the first gate voltage Vg1 has a high level and the second gate voltage Vg2 has a low level. The configuration of the driver circuit 10 will be described later.

A compulsory OFF circuit 50 includes a voltage monitoring circuit 52 and a compulsory OFF switch SW1. This compulsory OFF circuit 50 monitors the switching voltage Vsw, and if a predetermined threshold voltage is exceeded, the synchronous rectifier transistor M2 is switched OFF. In the present embodiment, the threshold is set to a ground potential.

The voltage monitoring circuit 52 compares the switching voltage Vsw and the ground potential (0 volts); when Vsw>0, a detection signal Vsens has a high level, and when Vsw<0, the detection signal Vsens has a low level.

The compulsory OFF switch SW1 is arranged between the gate terminal of the synchronous rectifier transistor M2 and the driver circuit 10, and outputs a second gate voltage Vg2' to be applied to the gate terminal of the synchronous rectifier transistor M2, based on the detection signal Vsens outputted from the voltage monitoring circuit 52. The second gate voltage Vg2' has a low level in a period in which the detection signal Vsens outputted from the voltage monitoring circuit 52 has a high level, and the second gate voltage Vg2 is outputted as it is, in a period in which the detection signal Vsens has a low level.

Figure 3:
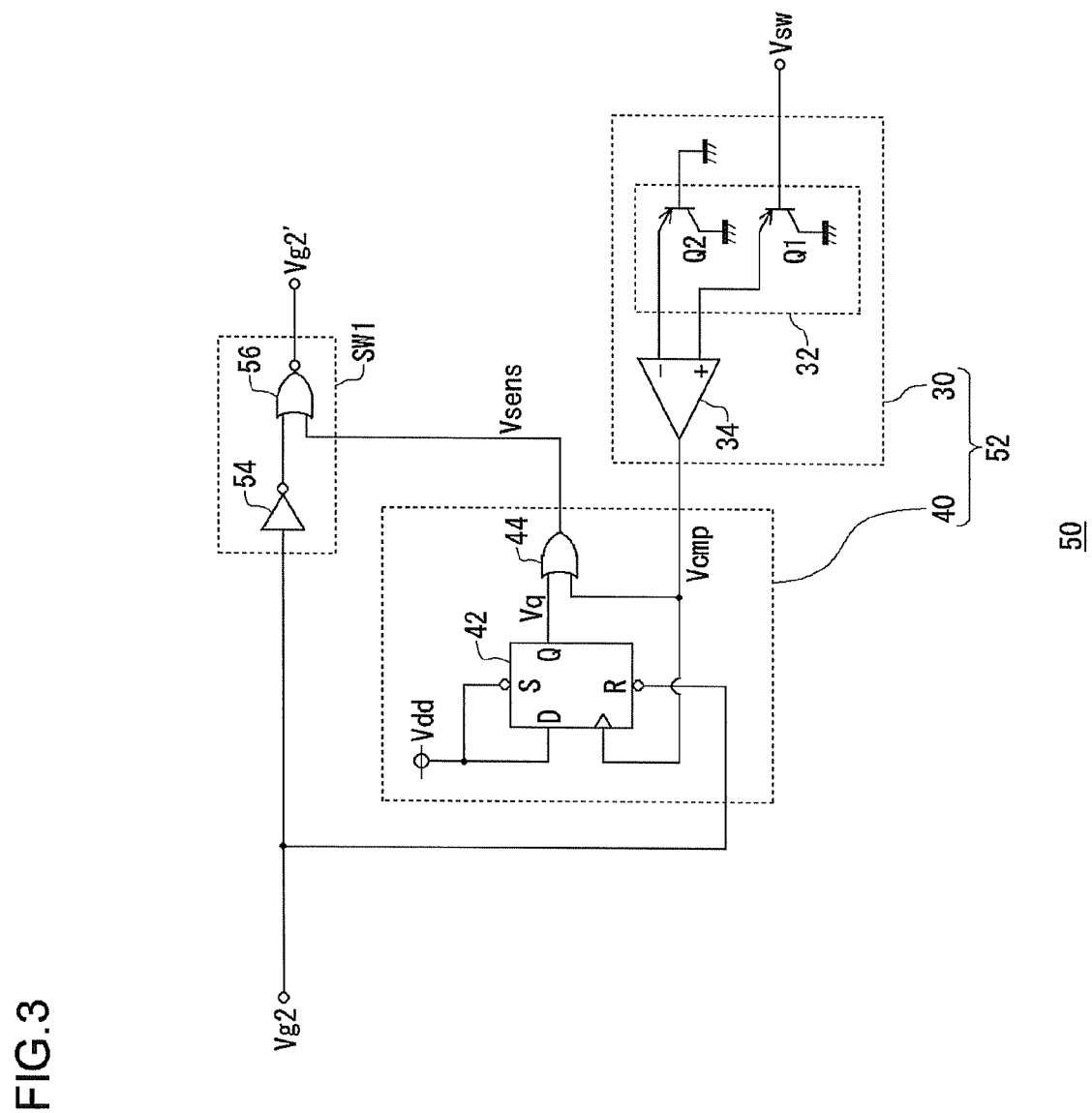
FIG. 3 is a circuit diagram showing an internal configuration of a compulsory OFF circuit.

FIG. 3 is a circuit diagram showing an internal configuration of a compulsory OFF circuit 50. The voltage monitoring circuit 52 includes a comparator 30 and a latch circuit 40.

The switching voltage Vsw is inputted to the comparator 30. The comparator 30 compares the switching voltage Vsw and the ground potential, and when the switching voltage Vsw exceeds the ground potential, outputs a high level comparison signal Vcmp. The comparator 30 includes a level shift circuit 32 and a second comparator 34.

The level shift circuit 32 includes PNP type first and second bipolar transistors Q1 and Q2, and the switching voltage Vsw and the ground potential GND are inputted to the respective base terminals. Collector terminals of each of the bipolar transistors Q1 and Q2 are grounded, and, from emitter terminals thereof, a voltage is outputted, in which the switching voltage Vsw and the ground potential are level-shifted in a forward direction by a voltage of approximately Vf=0.7 volts.

The emitter terminal of the first bipolar transistor Q1 is connected to the non-inverting input terminal of the second comparator 34, and the emitter terminal of the second bipolar transistor Q2 is connected to the inverting input terminal. The second comparator 34 compares the ground potential (0 volts) and the switching voltage Vsw that has been level-shifted by the level shift circuit 32, and outputs at a high level when Vsw>0 volts, and at a low level when Vsw<0 volts.

The second gate voltage Vg2 outputted from the driver circuit 10, and the comparison signal Vcmp outputted from the comparator 30 are inputted to the latch circuit 40. This latch circuit 40 is active in a period in which the synchronous rectifier transistor M2 is ON, that is, a period in which the second gate voltage Vg2 outputted from the driver circuit 10 has a high level; the latch circuit 40 latches the comparison signal Vcmp, outputted from the comparator 30, and outputs the latched signal as the detection signal Vsens. Furthermore, the latch circuit 40 resets a latched detection result, when the second gate voltage Vg2 changes from a high level to a low level.

The latch circuit 40 includes a D flip-flop 42 and an OR gate 44. The power supply voltage Vdd corresponding to a high level is inputted to a data terminal and a set terminal of the D flip-flop 42, and the second gate voltage Vg2 is inputted to the reset terminal.

Furthermore, the comparison signal Vcmp outputted from the comparator 30 is inputted to a clock terminal of the D flip-flop 42. When the comparison signal Vcmp has a high level, in a period in which the second gate voltage Vg2 has a high level, the latch circuit 40 outputs an output signal Vq at a high level from an output terminal.

The comparison signal Vcmp outputted from the comparator 30 and the output signal Vq of the D flip-flop 42 are inputted to the OR gate 44, and the logical add of the two signals is outputted as the detection signal Vsens to the compulsory OFF switch SW1. Moreover, the output signal Vq of the D flip-flop 42 may be directly outputted to the compulsory OFF switch SW1, without providing the OR gate 44.

The compulsory OFF switch SW1 includes an inverter 54 and a NOR gate 56. The second gate voltage Vg2 outputted from the driver circuit 10 is inputted to an input terminal of the inverter 54. The inverter 54 inverts the second gate voltage Vg2, and outputs to a first input terminal of the NOR gate 56. The detection signal Vsens outputted from the latch circuit 40 is inputted to a second input terminal of the NOR gate 56. The compulsory OFF switch SW1 outputs an output signal of the NOR gate 56 as a second gate voltage Vg2'.

According to the compulsory OFF switch SW1 configured in this way, only in a period in which the second gate voltage Vg2 has a high level and the detection signal Vsens has a low level, the second gate voltage Vg2' actually applied to the gate terminal of the synchronous rectifier transistor M2 has a high level, and the synchronous rectifier transistor M2 is ON. On the other hand, in other periods, the second gate voltage Vg2' has a low level, and the synchronous rectifier transistor M2 is OFF.

Figure 4:
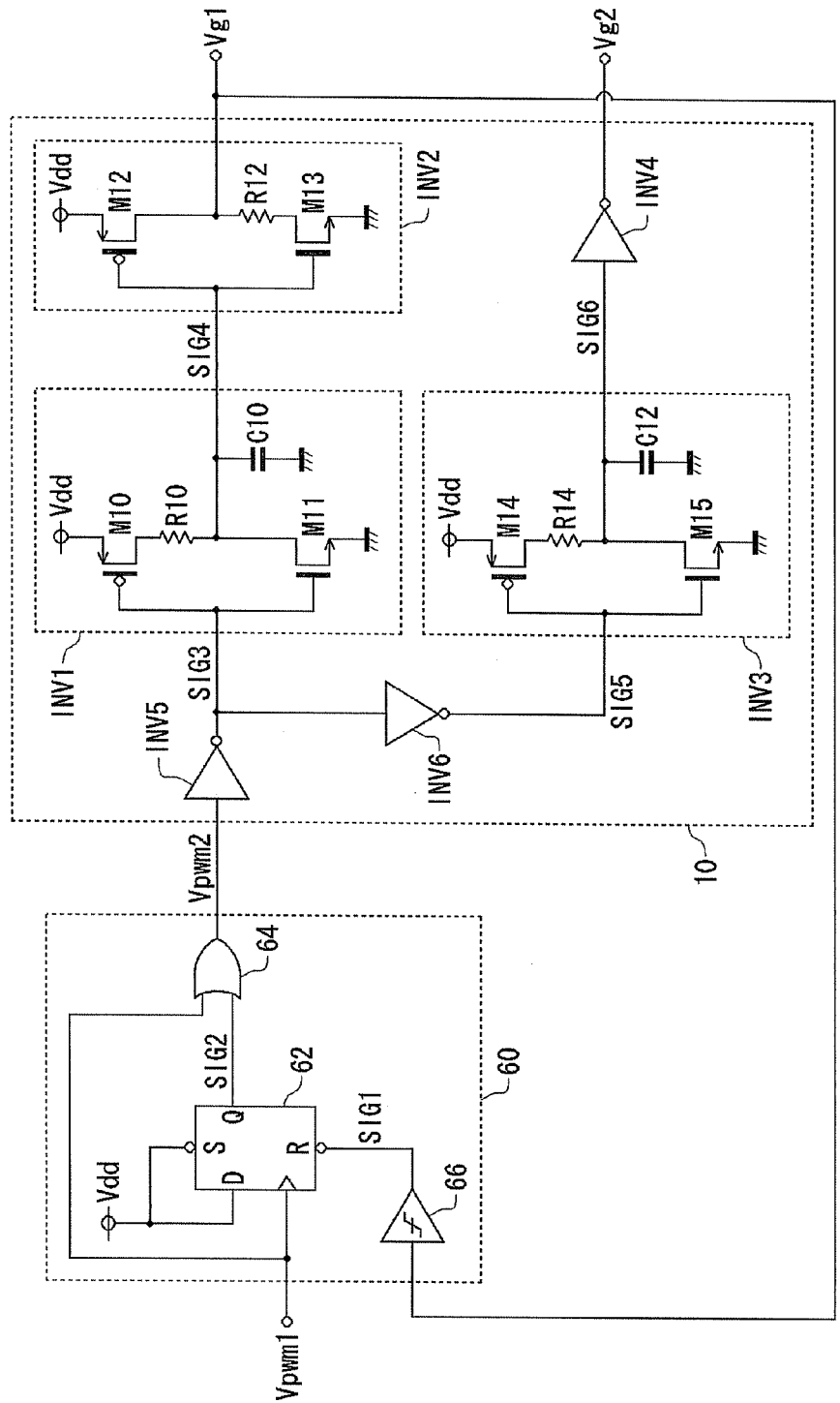
FIG. 4 is a circuit diagram showing a configuration of a minimum ON time setting circuit and a driver circuit.

FIG. 4 is a circuit diagram showing a configuration of the minimum ON time setting circuit 60 and the driver circuit 10. The minimum ON time setting circuit 60 includes the D flip-flop 62, the OR gate 64, and a third comparator 66, and a first gate voltage Vg1 and the first PWM signal Vpwm1 are inputted. The third comparator 66 compares the first gate voltage Vg1 and a predetermined threshold voltage Vth1, and outputs a first signal SIG1 that has a high level when Vg1>Vth1, and a low level when Vg1<Vth1.

The power supply voltage Vdd is inputted to the data terminal and the set terminal of the D flip-flop 62; the first PWM signal Vpwm1 is inputted to the clock terminal; and the first signal SIG1 outputted from the third comparator 66 is inputted to the reset terminal. That is, the D flip-flop 62 is set by the first PWM signal Vpwm 1, and is reset by the output signal SIG1 of the third comparator 66. The OR gate 64 generates the logical add of the first PWM signal Vpwm1 and the second signal SIG2 outputted from the D flip-flop 62. Output of the OR gate 64 is outputted to the driver circuit 10, as the second PWM signal Vpwm2.

The driver circuit 10 includes a first inverter INV1, a second inverter INV2, a third inverter INV3, a fourth inverter INV4, a fifth inverter INV5, and a sixth inverter INV6, and, based on the second PWM signal Vpwm2 outputted from the minimum ON time setting circuit 60, generates the first gate voltage Vg1 and the second gate voltage Vg2.

The fifth inverter INV5 outputs a third signal SIG3, which is the second PWM signal Vpwm2 inverted. The third signal SIG3 outputted from the fifth inverter INV5 is outputted to the first inverter INV1 and the sixth inverter INV6.

The first inverter INV1 and the second inverter INV2 generate the first gate voltage Vg1. The first inverter INV1 and the second inverter INV2 are first delay circuits that delay one edge of the second PWM signal Vpwm2, which is an output signal of the minimum ON time setting circuit 60, and generate the first gate voltage Vg1.

The first inverter INV1 includes transistors M10 and M11, a resistor R10, and a capacitor C10. The transistor M10, the resistor R10, and the transistor M11 are connected in series between the power supply voltage Vdd and the ground potential. The capacitor C10 is arranged in parallel with the transistor M11. An output signal of the first inverter INV1 is referred to as a fourth signal SIG4.

The second inverter INV2 includes a transistor M12, a resistor R12, and a transistor M13, connected in series between the power supply voltage Vdd and the ground potential. The second inverter INV2 inverts the fourth signal SIG4, and outputs the fourth signal SIG4 as the first gate voltage Vg1.

When the third signal SIG3 changes from a high level to a low level, the fourth signal SIG4 increases in accordance with a CR time constant determined by the capacitor C10 and the resistor R10. When the fourth signal SIG4 reaches a threshold voltage Vth2 of the second inverter INV2, the first gate voltage Vg1, which is output of the second inverter INV2, transits from a high level to a low level.

That is, the first inverter INV1 and the second inverter INV2 function as delay circuits. As a result, the first gate voltage Vg1 changes after a delay time $\Delta T1$ has elapsed from when the third signal SIG3 and the second PWM signal Vpwm2 have changed.

The second gate voltage Vg2 is generated by the sixth inverter INV6, the third inverter INV3, and the fourth inverter INV4.

The sixth inverter INV6 inverts the third signal SIG3 outputted from the fifth inverter INV5, to generate the fifth signal SIG5, and outputs to the third inverter INV3.

The third inverter INV3 includes transistors M14 and M15, a resistor R14, and a capacitor C12, and is composed in a similar way to the first inverter INV1. That is, the third inverter INV3 inverts and delays the fifth signal SIG5, and outputs the sixth signal SIG6 thus obtained, to the fourth inverter INV4. The fourth inverter INV4 inverts the sixth signal SIG6 and generates the second gate voltage Vg2.

Similarly to the first inverter INV1 and the second inverter INV2, the third inverter INV3 and the fourth inverter INV4 function as delay circuits. A delay time generated by the third inverter INV3 and the fourth inverter INV4 is $\Delta T2$.

The delay times $\Delta T1$ and $\Delta T2$ generated by the fourth inverter INV4 from the first inverter INV1 are deadtimes at which both the switching transistor M1 and the synchronous rectifier transistor M2 are not ON.

Furthermore, the driver circuit 10 includes a time constant circuit for changing the first gate voltage Vg1 with a predetermined time constant. The time constant circuit is configured to include the second inverter INV2 and gate capacitance of the switching transistor M1.

When the first gate voltage Vg1 switches from a high level to a low level, and the switching transistor M1 switches from OFF to ON, current is extracted via the resistor R12 and the transistor M13, from the gate capacitance of the switching transistor M1. At this time, since the resistor R12 and the gate capacitance of the switching transistor M1 compose the CR time constant circuit, it is possible to change the first gate voltage Vg1 with a time constant. The value of the time constant can be adjusted by a resistance value of the resistor R12.

The explanation now returns to FIG. 2. The linear regulator 70 includes an output transistor M3 and the error amplifier 72, and steps down and outputs the battery voltage Vbat inputted to the control circuit 100. The output transistor M3 is a P channel MOS transistor; a source terminal is connected to an input terminal 102, and the battery voltage Vbat is applied. The drain terminal of the output transistor M3 is connected to a switching terminal 104, and an output signal of the error amplifier 72 is inputted to a gate terminal which is a control terminal. A reference voltage Vref and an output voltage Vout' are respectively inputted to an inverting terminal and a non-inverting terminal of the error amplifier 72. The output voltage Vout' is a voltage, whereby the output voltage Vout of the power supply apparatus 200 is divided by the first resistor R1 and the second resistor R2 of the PWM controller 20.

The linear regulator 70 is provided with an enabling terminal, and is in an operating state when an enabling signal LDOEN has a high level. Furthermore, when the enabling signal LDOEN has a low level, the linear regulator 70 is in a halt state in which the error amplifier 72 is OFF, and consumed current is reduced.

The selector circuit 80 monitors error voltage Verr between the output voltage Vout' generated by the PWM controller 20 and the reference voltage Vref, and when a predetermined state continues for a predetermined determination period (referred to below as a first period Tp1), with the linear regulator 70 in an operating state, the step down switching regulator is in a halt state. The first period Tp1 is set to be, approximately, a few ms (milliseconds) to 100 ms. The selector circuit 80 includes a comparator 82, a digital filter 84, a state machine 86, and a current monitoring circuit 90.

The comparator 82 compares the error voltage Verr and a predetermined threshold voltage Vth3, and outputs a seventh signal SIG7 that has a high level when Verr<Vth3, and a low level when Verr>Vth3. This seventh signal SIG7 is inputted to the digital filter 84. The digital filter 84 is a time measurement circuit for measuring time at which the seventh signal SIG7 has a high level. A time constant of this digital filter 84 is set to the abovementioned first period Tp1. After the first period Tp1 has elapsed, after the seventh signal SIG7 has transited from a low level to a high level, an eighth signal SIG8, outputted from the digital filter 84, has a high level.

The eighth signal SIG8 outputted from the digital filter 84 is inputted to the state machine 86. When the eighth signal SIG8 has a high level, the state machine 86 puts the linear regulator 70 in an operating state, with the enabling signal LDOEN of the linear regulator 70 at a high level.

Furthermore, after the elapse of a predetermined light-load transition period (referred to below as a second period Tp2) from when the enabling signal LDOEN has a high level, the state machine 86 puts the switching regulator in a halt state, with the enabling signal DCDCEN of the switching regulator at a low level.

The current monitoring circuit 90 monitors output current of the linear regulator 70, and when the output current exceeds a predetermined threshold current, puts the step down switching regulator 110 in an operating state, and also puts the linear regulator 70 in a halt state. The current monitoring circuit 90 includes a sensing transistor M4 connected commonly with a gate terminal, which is a control terminal, to the output transistor M3, a sensing resistor R4 arranged on an electrical current path of the sensing transistor M4, and a comparator 88 for monitoring voltage drop across the sensing resistor R4.

With the linear regulator 70 in the operating state, when the load current Io increases, the output current of the output transistor M3 increases. With regard to the output transistor M3 and the sensing transistor M4, since the gate terminal and the source terminal are commonly connected, a current corresponding to the load current Io flows in the sensing transistor M4. The sensing resistor R4 converts the current flowing in the sensing transistor M4 into voltage. A ninth signal SIG9 outputted from the comparator 88 is inputted to the state machine 86 and has a high level when the voltage drop across the sensing resistor R4 exceeds a threshold voltage Vth4.

When the output signal SIG9 of the comparator 88 has a high level, the state machine 86 puts the step down switching regulator 110 into an operating state, with an enabling signal DCDCEN at a high level. After the elapse of a predetermined heavy-load transition period (referred to below as a third period Tp3), after the step down switching regulator 110 is put in an operating state, the state machine 86 puts the linear regulator 70 in a halt state, with the enabling signal LDOEN at a low level.

Below, operation of the control circuit 100 according to the present embodiment is explained.

Figure 5:
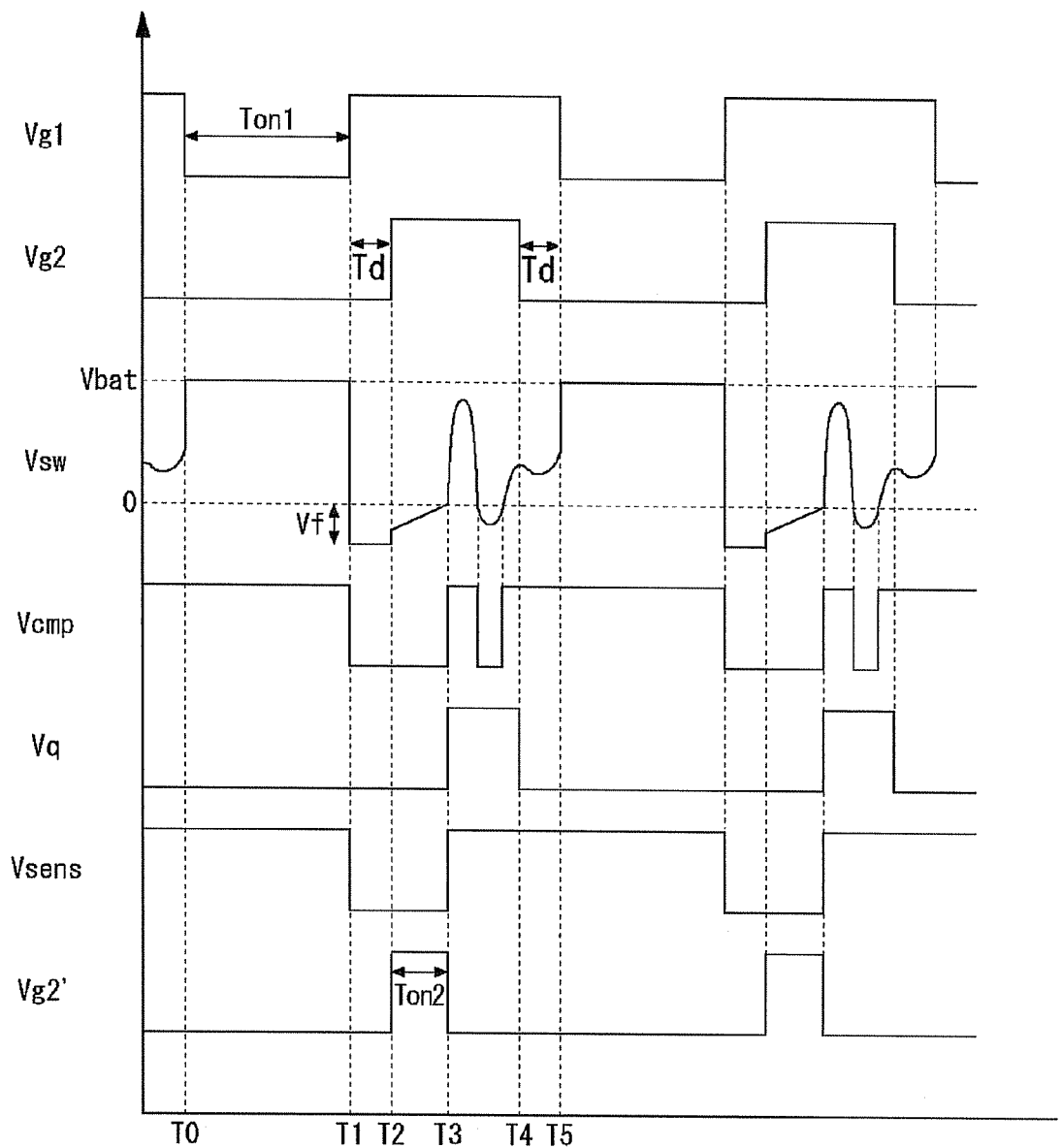
FIG. 5 is a time chart showing an operating state of the power supply apparatus of FIG. 2.

FIG. 5 is a time chart showing an operating state of the control circuit 100 according to the present embodiment. The time chart of FIG. 5 explains operation when the load is light, where the load current Io is small, and shows the operation when the current IL flowing in the inductor L1 via the synchronous rectifier transistor M2, is O amps at a certain time.

The switching transistor M1 is OFF when the first gate voltage Vg1 has a high level, and is ON when the first gate voltage Vg1 has a low level. That is, a period in which the switching transistor M1 is ON is shown by Ton1 in the figure.

The second gate voltage Vg2 shows a voltage to be applied to the synchronous rectifier transistor M2, generated by the driver circuit 10. Furthermore, in the figure, the second gate voltage Vg2' shows a voltage actually applied to the gate terminal of the synchronous rectifier transistor M2. The synchronous rectifier transistor M2 is ON when the second gate voltage Vg2' has a high level, and is OFF when the second gate voltage Vg2' has a low level. A period in which the synchronous rectifier transistor M2 is ON is shown by Ton2 in the figure. Furthermore, Td in the figure is dead time in which both the switching transistor M1 and the synchronous rectifier transistor M2 are not ON.

As described above, the compulsory OFF switch SW1 is arranged between the driver circuit 10 and the synchronous rectifier transistor M2, and in a period in which the detection signal Vsens outputted from the latch circuit 40 has a low level, the inputted second gate voltage Vg2 is outputted as it is, as the second gate voltage Vg2'. Furthermore, in a period in which the detection signal Vsens has a high level, the gate voltage Vg2' of the synchronous rectifier transistor M2 has a low level irrespective of the value of the gate voltage Vg2 outputted from the driver circuit 10, and the synchronous rectifier transistor M2 is compulsorily OFF.

In a period from time T0 to T1, the switching transistor M1 is ON, and the synchronous rectifier transistor M2 is OFF. At time T1, the first gate voltage Vg1 of the switching transistor M1 goes to a high level, and the switching transistor M1 turns OFF. After that, in the dead time period of time T1 to T2, the switching transistor M1 and the synchronous rectifier transistor M2 are both OFF. When the switching transistor M1 turns OFF at time T1, the current that was flowing in the inductor L1 up until then is no longer supplied from the switching transistor M1.

Here, The current IL flowing in the inductor L1 must be continuous. The back gate terminal of the synchronous rectifier transistor M2 is now grounded, and there is a body diode D2, shown in FIG. 2, in between the back gate terminal and the drain terminal. Therefore, in a period from when the switching transistor M1 turns OFF at time T1, to when the synchronous rectifier transistor M2 turns ON at time T2, a current is flowing via this body diode D2, through the inductor L1. In this time, a switching voltage Vsw, which is a diode forward direction voltage lower by Vf=0.7 volts, from the ground potential 0 volts, occurs in the switching terminal 104.

At time T2, the second gate voltage Vg2 changes from a low level to a high level. At this time, since the sensing voltage Vsens goes to a low level, the second gate voltage Vg2', that is the output of the compulsory OFF switch SW1, becomes high level, and the synchronous rectifier transistor M2 turns ON. By the synchronous rectifier transistor M2 being made ON, the current flowing in the inductor L1 via the body diode D2 of the synchronous rectifier transistor M2 is supplied as a drain current of the synchronous rectifier transistor M2.

By the drain current of this synchronous rectifier transistor M2 flowing via the inductor L1 to the output capacitor C1, the output voltage Vout of the output capacitor C1 gradually increases. During this time, in the inductor L1, the current flowing from the synchronous rectifier transistor M2 towards the output capacitor C1 gradually decreases. When the current IL flowing in the inductor L1 via the synchronous rectifier transistor M2 decreases with time, since the voltage between the drain and source of the synchronous rectifier transistor M2 decreases gradually, the switching voltage Vsw gradually increases and approaches the ground potential 0 volts.

In due course, at time T3, when the current IL flowing in the inductor L1 becomes 0 amps, since the drain-source voltage of the synchronous rectifier transistor M2 becomes 0 volts, the switching voltage Vsw becomes 0 volts. At this time, the comparison signal Vcmp outputted from the comparator 30 switches from a low level to a high level. When the comparison signal Vcmp has a high level, the detection signal Vsens outputted from the latch 40 also has a high level. As a result, the gate voltage Vg2' of the synchronous rectifier transistor M2 is fixed at a low level by the compulsory OFF switch SW1, and the synchronous rectifier transistor M2 turns OFF.

Furthermore, when the high level comparison signal Vcmp is inputted to the clock terminal of the D flip-flop 42, the output signal Vq of the D flip-flop 42 goes to a high level. Since a high level signal is inputted to the data terminal of the D flip-flop 42, the output signal Vq of the D flip-flop 42 is kept at a high level until the next time resetting is done. The latch circuit 40 including this D flip-flop 42 latches the comparison signal Vcmp outputted from the comparator 30.

When the second gate voltage Vg2' goes to a low level at time T3, both the switching transistor M1 and the synchronous rectifier transistor M2 turn OFF, and become a high impedance state. At this time, oscillation of the voltage is induced by the inductor L1, and the switching voltage Vsw swings to a large extent, as shown in FIG. 5. At this time, when the switching voltage Vsw fluctuates, crossing the ground potential 0 volts, the comparison signal Vcmp switches between a high level and a low level.

Here, as described above, in the control circuit 100 according to the present embodiment, the compulsory OFF switch SW1 is controlled, based on a logical add of the comparison signal Vcmp from the comparator 30 and the output signal of the D flip-flop 42. Accordingly, even if the signal level of the comparison signal Vcmp fluctuates, since the output signal Vq of the D flip-flop 42 is latched at a high level, output of the OR gate 44, that is, the detection signal Vsens remains at a high level. As a result, irrespective of fluctuations of the switching voltage Vsw, the synchronous rectifier transistor M2 can continue to be OFF.

At time T4, the driver circuit 10 switches the second gate voltage Vg2 to a low level. When the second gate voltage Vg2 goes to a low level, the D flip-flop 42 is reset, and the output signal Vq thereof goes to a low level. After that, at time T5, the first gate voltage Vg1 goes to a low level, and the switching transistor M1 turns ON.

The control circuit 100 according to the present embodiment, when the load is light, repeats this operation, with time T0 to T5 as one cycle, so as to drop the battery voltage Vbat, and supply a desired output voltage Vout to the load circuit RL.

Here, the output voltage Vout of the step down switching regulator 110 is determined based on a ratio of the ON time of the switching transistor M1 and the synchronous rectifier transistor M2. Accordingly, when the load is light, when the synchronous rectifier transistor M2 is compulsorily made OFF, the ON time Ton2 of the synchronous rectifier transistor M2 becomes short, and with this, the ON time Ton1 of the switching transistor M1 becomes short.

Figure 6:
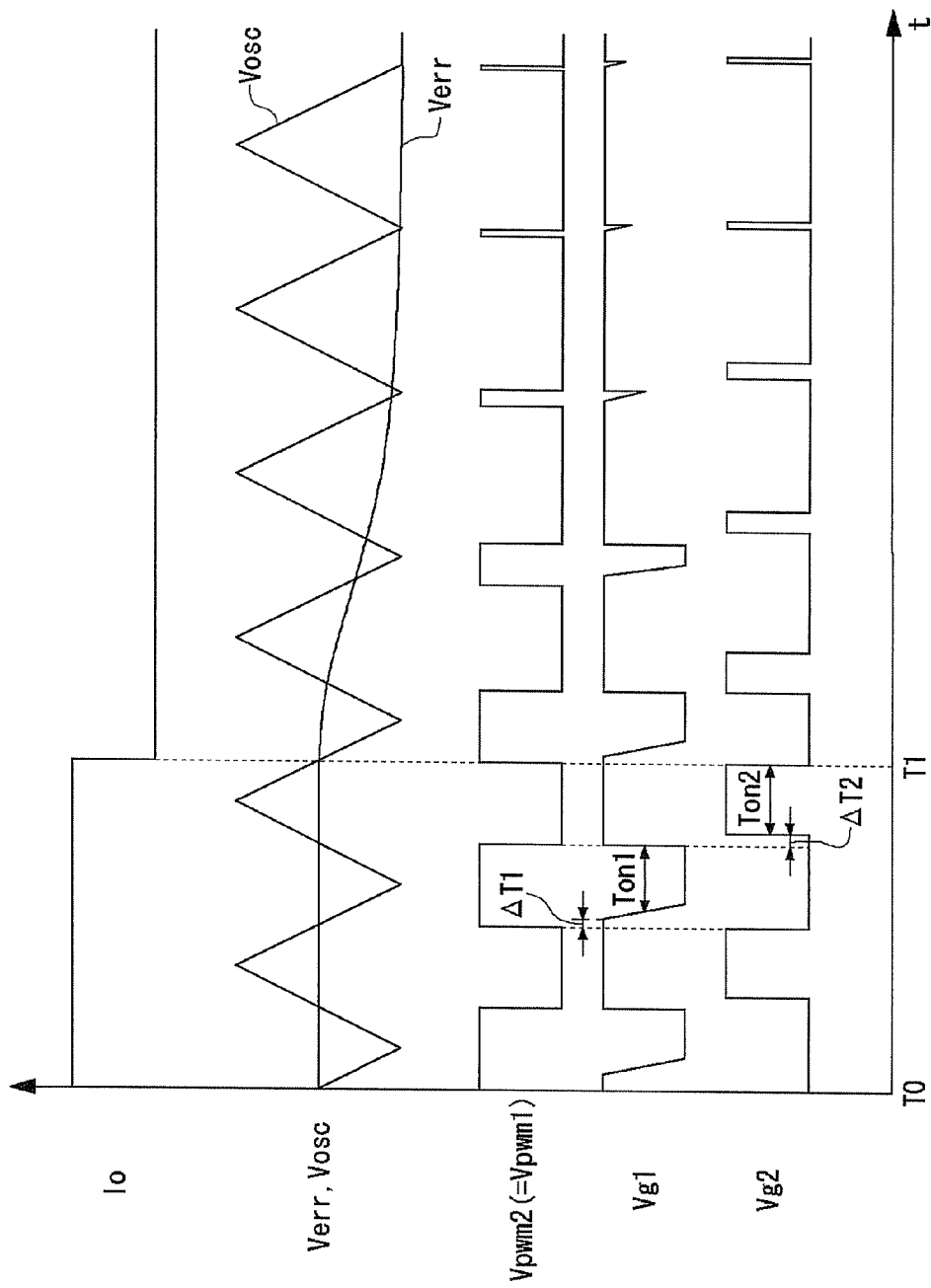
FIG. 6 is a time waveform diagram showing an operating state of the power supply apparatus of FIG. 2 when load is light, and is a diagram showing voltage and current waveform when the minimum ON time setting circuit is not made to operate.

FIG. 6 is a time waveform diagram showing an operating state of the power supply apparatus 200 when the load is light, and is a diagram showing voltage and current waveform when the minimum ON time setting circuit 60 is not made to operate. At this time, the minimum ON time setting circuit 60 outputs the first PWM signal Vpwm1, which has been inputted, as the second PWM signal Vpwm2, as it is. In a heavy load state at time T0 to T1, the first gate voltage Vg1 and the second voltage Vg2 repeatedly alternate between a high level and a low level, based on the second PWM signal Vpwm2. As described above, after a delay period $\Delta T1$ has elapsed after the second PWM signal Vpwm2 has switched from a low level to a high level, the first gate voltage Vg1 has a low level. Furthermore, after a delay period $\Delta T2$ has elapsed after the second PWM signal Vpwm2 has switched from a high level to a low level, the second gate voltage Vg2 has a high level.

In the figure, $\Delta T1$ and $\Delta T2$ are dead times at which the switching transistor M1 and the synchronous rectifier transistor M2 are both OFF, and correspond to Td of FIG. 5. Moreover, as described above, since the resistor R12 is provided in the second inverter INV2, the first gate voltage Vg1 decreases at a predetermined time constant.

The load current Io decreases, and a light load state occurs at time T1. When the current IL flowing in the inductor L1 becomes negative, the synchronous rectifier transistor M2 is put compulsorily in an OFF state, by the compulsory OFF circuit 50. In the light load state, the period in which the second gate voltage Vg2' has a high level, that is, the ON period Ton2 of the synchronous rectifier transistor M2, is short in comparison to the period in which the first PWM signal Vpwm1 has a low level.

Here, the output voltage Vout of the step down switching regulator 110 is determined based on a ratio of the ON time of the switching transistor M1 and the synchronous rectifier transistor M2. The control circuit 100 performs feedback control so that the output voltage Vout maintains a constant value, and in accordance with the ON time Ton2 of the synchronous rectifier transistor M2 becoming short, the ON time Ton1 of the switching transistor M1 gradually becomes shorter. This condition is illustrated after time T1 in FIG. 6.

The ON period Ton1 of the switching transistor M1, which is the period in which the first gate voltage Vg1 has a low level, gradually gets shorter, and the amplitude of the first gate voltage Vg1 becomes small. When the amplitude of the first gate voltage Vg1 becomes small, a state occurs in which the switching transistor M1 is not ON, and, in due course, with the switching transistor M1 OFF, a state occurs in which the first gate voltage Vg1 fluctuates only a little. In order that the first gate voltage Vg1 fluctuates, since it is necessary to charge and discharge the gate capacitance of the switching transistor M1, unnecessary gate drive current is consumed.

Figure 7:
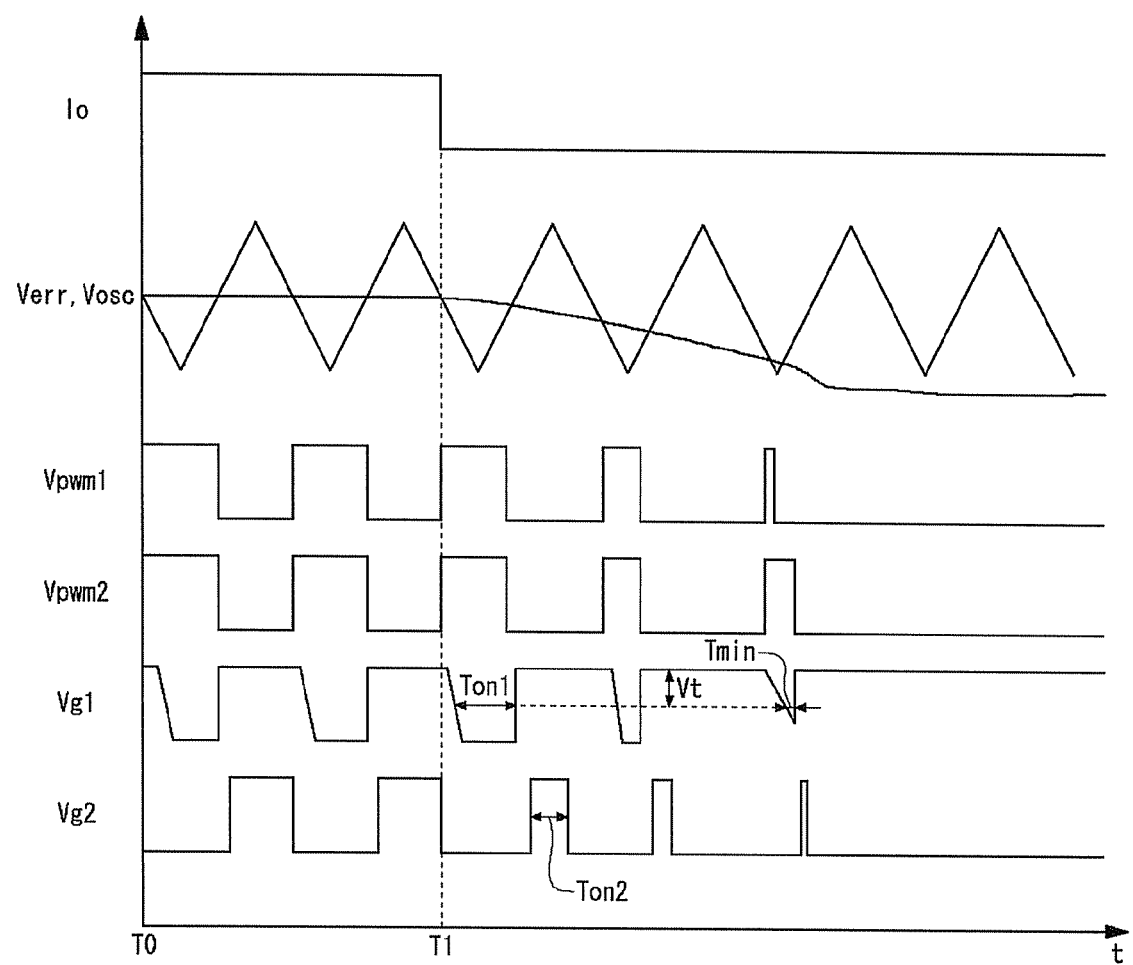
FIG. 7 is a time waveform diagram showing an operating state of the power supply apparatus of FIG. 2 when the load is light, and is a diagram showing the voltage and current waveform when the minimum ON time setting circuit is made to operate.

The control circuit 100 according to the present embodiment can preferably reduce this unnecessary current. FIG. 7 is a time waveform diagram showing an operating state of the power supply apparatus 200 of the present embodiment when the load is light, and is a diagram showing voltage waveform when the minimum ON time setting circuit 60 is made to operate.

Similar to cases in which the minimum ON time setting circuit 60 of FIG. 6 is not provided, in a light load state after time T1, the synchronous rectifier transistor M2 is compulsorily made OFF, and the ON time of the switching transistor M1 is gradually made shorter. As described above, the minimum ON time setting circuit 60 outputs, to the driver circuit 10, a second PWM signal Vpwm2 that limits the duty ratio of the first PWM signal Vpwm1, so that the ON time of the switching transistor M1 becomes longer than a predetermined minimum value. As a result, the ON time of the switching transistor M1 is limited so as not to be less than a minimum value shown as Tmin in the figure.

When the ON time of the switching transistor M1 is set to be longer than the first PWM signal Vpwm1 outputted from the PWM controller 20, the output voltage Vout of the step down switching regulator 110 increases, while the error voltage Verr decreases. As a result, Verr<Vosc, and the first PWM signal Vpmw1 has a low level. When the first PWM signal Vpwm1 has a low level, the first gate voltage Vg1 applied to a gate of the switching transistor M1 is fixed at a high level.

In this way, by setting a minimum value Tmin to the ON time of the switching transistor M1 by the power supply apparatus 200 of the present embodiment, when the load is light it is possible to realize a state in which the complete first PWM signal Vpwm1 has a low level. As a result, in a state in which the switching transistor M1 remains OFF, it is possible to restrain the first gate voltage Vg1 from fluctuating; and with regard to the driver 10, the current for charging and discharging the gate capacitance of the switching transistor M1 can be reduced.

After that, when the charge of the output capacitor C1 is discharged by the load current Io, and the output voltage Vout decreases, the error voltage Verr increases, and once again the switching operation restarts.

Figure 8:
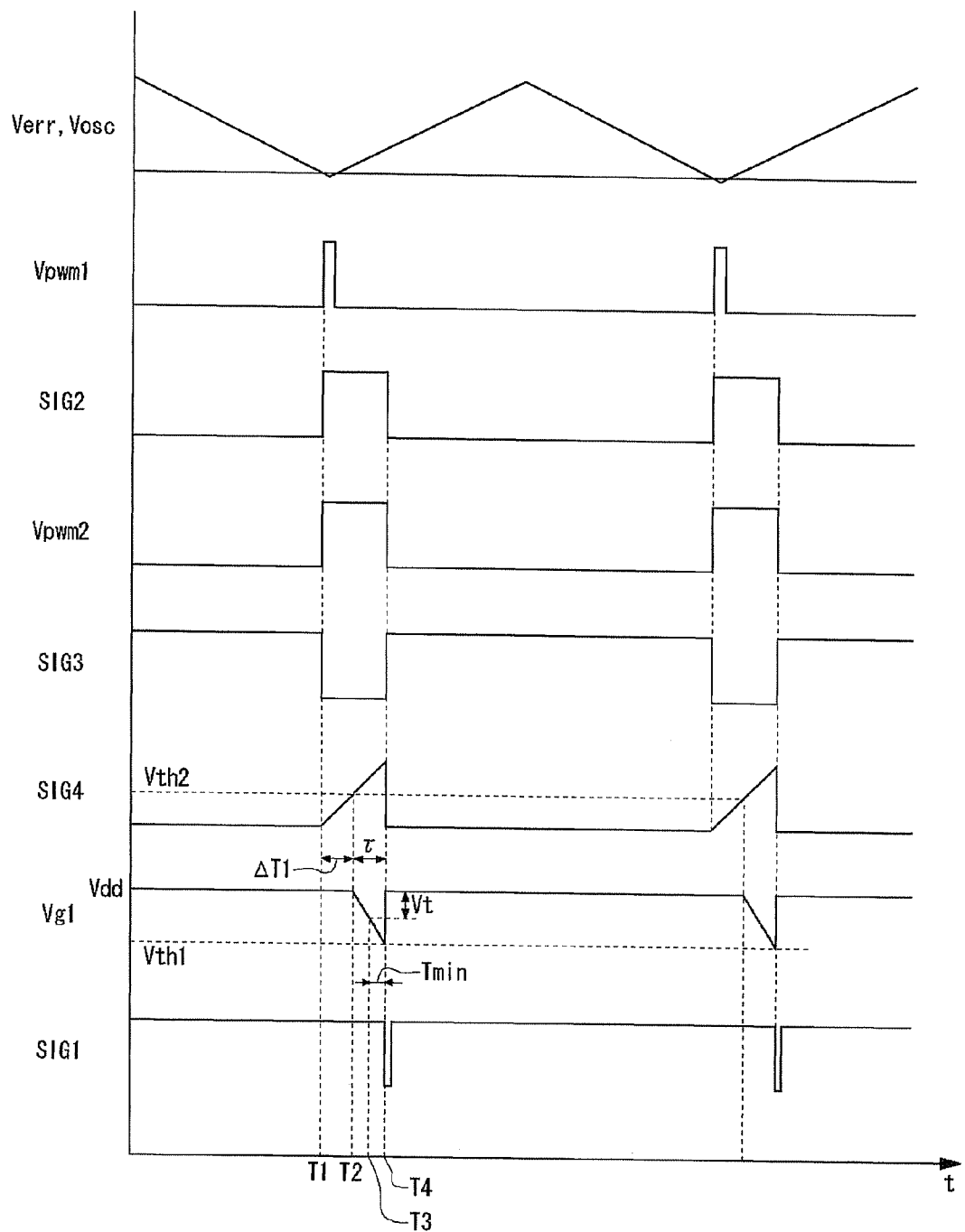
FIG. 8 is a diagram showing a condition when the minimum ON time setting circuit limits ON time of a switching transistor when the load is light.

FIG. 8 is a diagram showing a condition in which the minimum ON time setting circuit 60 limits ON time of the switching transistor M1, when the load is light. FIG. 8 shows an expanded view of a period after time T1 in FIG. 7.

In FIG. 8, a state where Vosc<Verr has occurs at time T1, then the first PWM signal Vpwm1 goes to a high level. When the first PWM signal Vpwm1 goes to a high level, the second signal SIG2, which is an output of the D flip-flop 62, becomes high level. At this time, the second PWM signal Vpwm2 outputted from the OR gate 64 also becomes high level.

When the second PWM signal Vpwm2 has a high level, the third signal SIG3 has a low level, and the fourth signal SIG4, which is an output of the first inverter INV1, gradually increases at the CR time constant. At time T2, when the fourth signal SIG4 reaches the threshold voltage Vth2 of the second inverter INV2, the first gate voltage Vg1 changes from a high level to a low level. This is shown by ΔT1 in the figure, and is a delay time generated by the first inverter INV1 and the second inverter INV2. Furthermore, due to the resistor R12 arranged in the second inverter INV2 and the fact that a CR time constant circuit is formed with the gate capacitance of the switching transistor M1, the first gate voltage Vg1 drops with a certain gradient.

At time T3, when Vg1<Vdd−Vt, and the voltage between gate sources of the switching transistor M1 (Vdd−Vg1) exceeds a MOSFET threshold voltage Vt, the switching transistor M1 is ON.

At time T4, when the first gate voltage Vg1 drops to the threshold voltage Vth1 of the third comparator 66, the D flip-flop 62 is reset by the first signal CIG1 outputted from the third comparator 66, and the second signal SIG2 has a low level. At this time, the second PWM signal Vpwm2 has a low level. When the second PWM signal Vpwm2 has a low level, the first gate voltage Vg1 has a high level, and the switching transistor M1 is OFF.

That is, in the period from time T3 when the first gate voltage Vg1 drops to (Vdd−Vt), to time T4 when it reaches the threshold voltage Vth1, the switching transistor M1 is ON. Accordingly, the ON time of the switching transistor M1 when the load is light depends on a time τ until the first gate voltage Vg1 decreases to the threshold voltage Vth1. The time τ can be adjusted by the threshold voltage Vth1 of the third comparator 66 and the resistor R12 of the second inverter INV2.

As shown in FIG. 8, the ON time of the switching transistor M1 is limited by the minimum ON time setting circuit 60 so as to be greater than or equal to a minimum value shown by Tmin in the figure.

Figure 9:
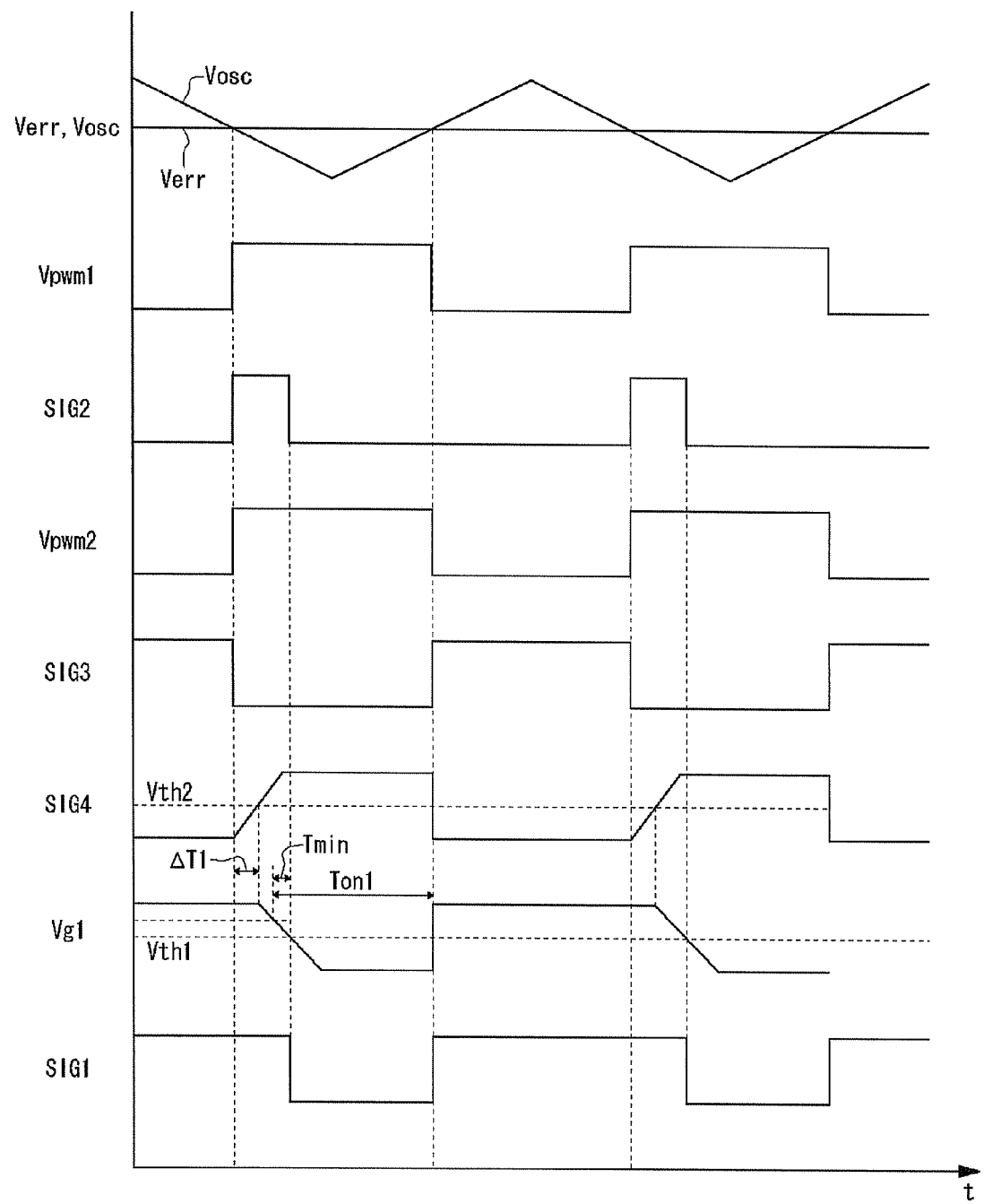
FIG. 9 is an operating waveform diagram showing a state of the minimum ON setting circuit when the load is heavy.

FIG. 9 is an operating waveform diagram showing a state of the minimum ON time setting circuit 60 when the load is heavy. When the load is heavy, unlike when the load is light as shown in FIG. 8, the period in which the first PWM signal Vpwm1 has a high level is sufficiently long. Here, the second PWM signal Vpwm2, which is an output of the OR gate 64, is the logical add of the first PWM signal Vpwm1 and the second signal SIG2, which is an output of the D flip-flop 62; and when the load is heavy, the period in which the second PWM signal Vpwm2 has a high level is longer than the minimum value Tmin set in the minimum ON time setting circuit G0. As a result, in a heavy load state, the high level periods of the second PWM signal Vpwm2 and the first PWM signal Vpwm1 match, and the minimum ON time setting circuit 60 can output the first PWM signal Vpwm1 as it is.

In this way, according to the control circuit 100 according to the present embodiment, in a light load state, by setting the minimum value of the ON time of the switching transistor M1, it is possible to prevent the first gate voltage Vg1 from fluctuating at small amplitudes, and to reduce consumed current.

Moreover, with regard to the control circuit 100, the latch circuit 40 is provided in the compulsory OFF circuit 50, and the comparison signal Vcmp, which has a high level when the switching voltage Vsw is larger than 0 volts, is latched. As a result, even in cases in which the switching voltage Vsw crosses over 0 volts and fluctuates, output of the compulsory OFF switch SW1 is not switched, the synchronous rectifier transistor M2 can continue to maintain an OFF state, and it is possible to perform a stable voltage drop operation.

Figure 10:
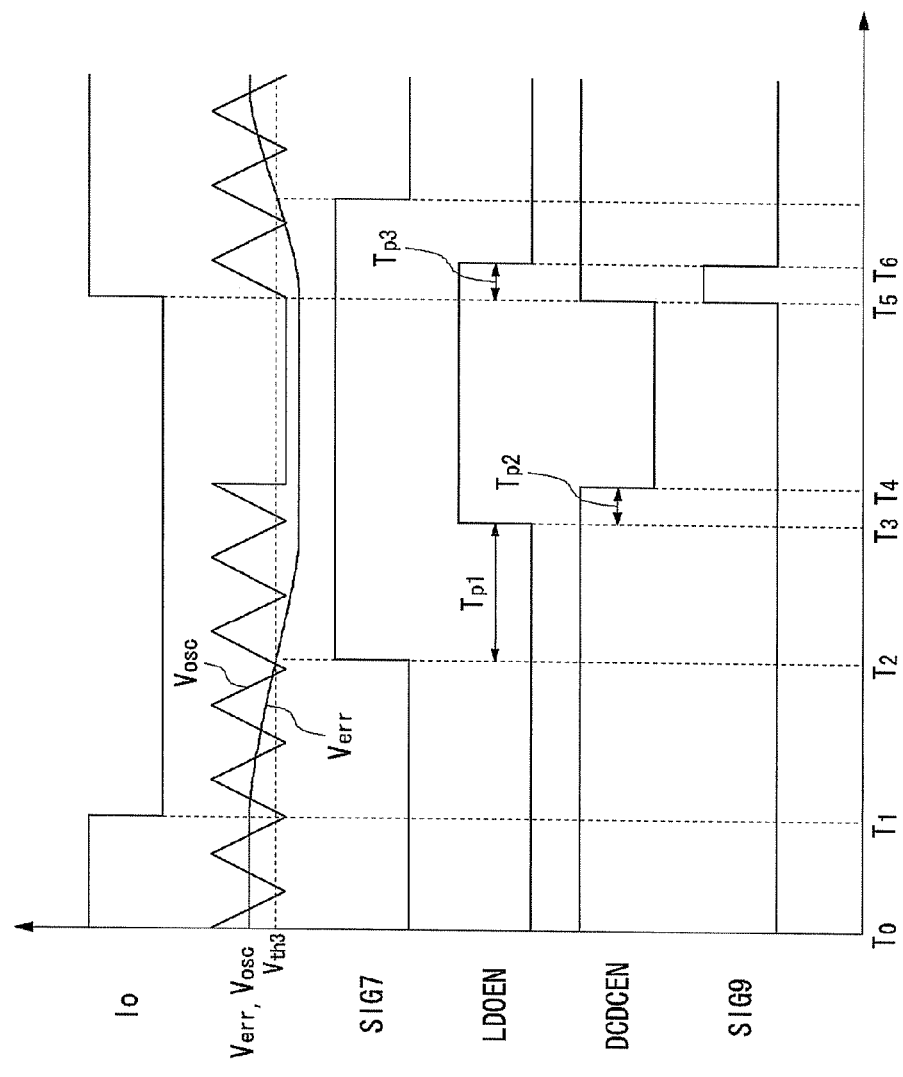
FIG. 10 is a diagram showing an operating waveform of the control circuit when the light load time continues for a long time.
Figure 11A:
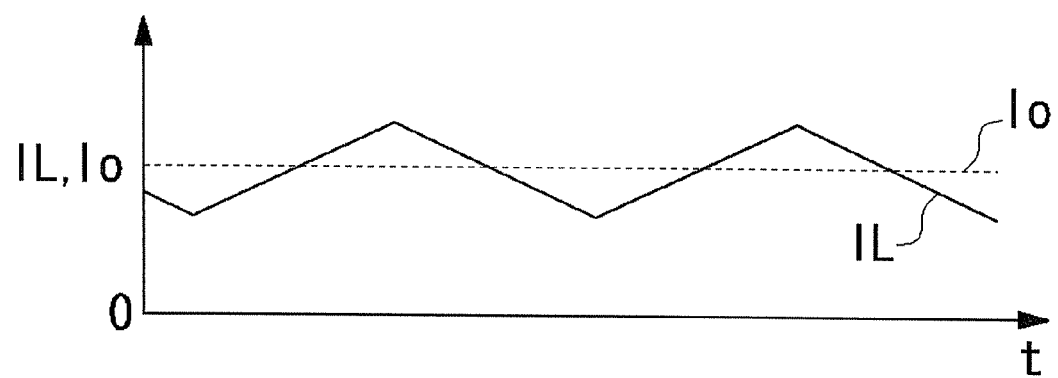
FIG. 11A and FIG. 11B are, respectively, diagrams showing time waveform of current when the load of a synchronous rectification type switching regulator is heavy and when the load thereof is light.
Figure 11B:
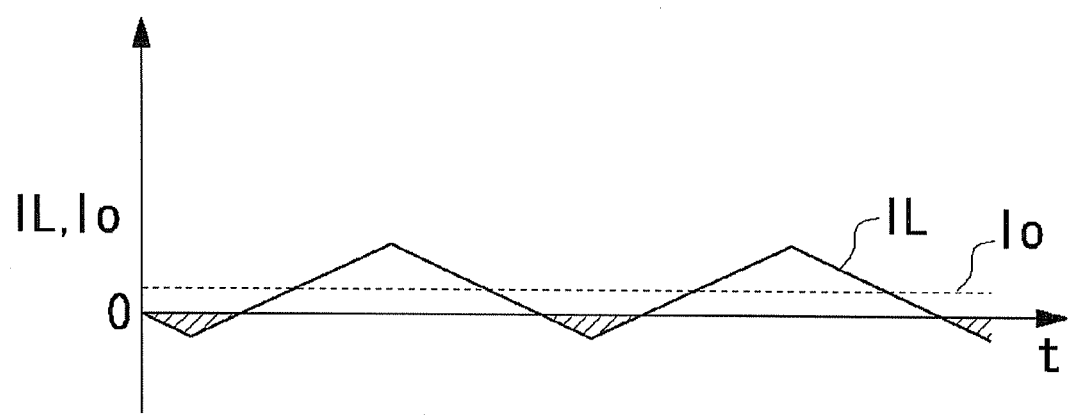

FIG. 10 is a diagram showing an operating waveform of the control circuit 100 when the light-load time continues for a long time. FIG. 10 shows, from the top, the load current Io, the error voltage Verr and the periodic voltage Vosc, the seventh signal SIG7 that is an output of the comparator 82, the enabling signal LDOEN of the linear regulator 70, the enabling signal DCDCEN of the switching regulator, and the ninth signal SIG9 that is an output of the comparator 88. From time T0 to time T1, the normal load current Io is flowing. The load current at time T1 decreases, and a light load state occurs. When the light load state occurs, as shown in the abovementioned FIG. 7, the ON time Ton2 of the synchronous rectifier transistor M2 gradually becomes short. Accompanying this, the ON time Ton1 of the switching transistor M1 becomes short, and has the minimum time Tmin. After that, the error voltage Verr decreases, and the switching operation halts.

The error voltage Verr decreases, and at time T2 when it goes lower than the threshold voltage Vth3 set in the comparator 82, the output signal SIG7 of the comparator 82 goes to a high level. After that, the light load state is maintained, and after the seventh signal SIG7 has a high level, at time T3 after the first period Tp1 has elapsed, the eighth signal SIG8 that is an output of the digital filter 84 goes to a high level. At time T3, the state machine 86 puts the enabling signal LDOEN at a high level, and the linear regulator 70 in an operating state. At time T4 after the second period Tp2 has elapsed, from time T3, the state machine 86 puts the enabling signal DCDCEN at a low level, and the step down switching regulator 110 in a halt state.

At time T5 the load circuit RL recovers from a standby state, and the load current Io increases. When the load current Io increases, since the output current of the linear regulator 70 increases, the current flowing in the sensing transistor M4 of the current monitoring circuit 90 also increases, and the ninth signal SIG9 that is an output of the comparator 88 goes to a high level. When the ninth signal SIG9 has a high level, the state machine 86 immediately switches the step down switching regulator 110 to an operating state, with the enabling signal DCDCEN at a high level. At time T6 after a predetermined third period Tp3 has elapsed from time T5, the state machine 86 puts the linear regulator 70 in a halt state. When the linear regulator 70 is in a halt state, the output current thereof decreases, and the ninth signal SIG9 has a low level. After that, when the error voltage Verr exceeds the threshold voltage Vth3, the seventh signal SIG7 has a low level.

In this way, according to the power supply apparatus 200 according to the present embodiment, when the normal load state transits to the light load state, and the light load state is maintained, a switch is made from the step down switching regulator 110 to the linear regulator 70. In the light load state, since the efficiency of the linear regulator 70 is higher, the consumed current can be decreased. In addition, when a switch is made from the step down switching regulator 110 to the linear regulator 70, since the step down switching regulator 110 is put in a halt state after the predetermined second period Tp2 has elapsed, after the linear regulator 70 is put in an operating state, at the time of switching it is possible to prevent the output voltage Vout of the power supply apparatus 200 from becoming unstable.

Furthermore, when the light load state returns to the normal load state, the output current of the linear regulator 70 is monitored, and when it exceeds a predetermined threshold current, by immediately putting the step down switching regulator 110 in an operating state, it is possible to preferably prevent a large current from flowing in the linear regulator 70 and the efficiency from deteriorating. Moreover, from when the step down switching regulator 110 has an operating state to when the linear regulator 70 is in a halt state, by setting the third period Tp3, it is possible to prevent the output voltage Vout of the power supply apparatus 200 from becoming unstable.

The abovementioned embodiment is an example; various modified examples in combinations of various component elements and various processes thereof are possible, and a person skilled in the art may understand that such modified examples are within the scope of the present invention.

In the embodiment, an explanation has been given in which a microcomputer is an example of the load circuit driven by the power supply apparatus 200 including the control circuit 100; however, there is no limitation thereto, and it is possible to supply the drive current to various load circuits operating in a light load state, in which load current decreases.

In the embodiment, an explanation is given concerning cases in which the control circuit 100 is integrated in one LSI; however, there is no limitation thereto, and part of the component elements may be arranged outside the LSI as discrete elements or as chip members, or a configuration may be made of a plurality of LSIs.

Furthermore, in the present embodiment, setting of high level and low level logical values is one example, and it is possible to make changes freely by suitable inversions by the inverter and the like.

While the preferred embodiments of the present invention have been described using specific terms, such description is for illustrative purposes only, and it is to be understood that changes and variations may be made without departing from the spirit or scope of the appended claims.

The invention claimed is:

1. A control circuit of a power supply apparatus in which a step down switching regulator and a linear regulator can be switched, the control circuit comprising:

an output stage, including a switching transistor and a synchronous rectifier transistor connected in series between an input terminal and grounding, which outputs a voltage at a connection point of the two transistors, as a switching voltage, to a switching regulator output circuit;

a pulse width modulator, which generates a pulse width modulation signal with which a duty ratio is controlled so that output voltage of the switching regulator output circuit approaches a predetermined reference voltage;

a compulsory OFF circuit, which monitors the switching voltage, and switches OFF the synchronous rectifier transistor when the switching voltage exceeds a first threshold voltage;

a minimum ON time setting circuit, which receives the pulse width modulation signal, limits the duty ratio of the pulse width modulation signal so that ON time of the switching transistor is longer than a predetermined minimum value;

a driver circuit, which generates a first and a second gate voltage to be applied to a gate terminal of the switching transistor and the synchronous rectifier transistor, based on an output signal of the minimum ON time setting circuit; and a selector circuit, which monitors an error voltage between the output voltage and the reference voltage, and when a predetermined state continues for a predetermined determination period, puts the linear regulator in an operating state, and puts the step down switching regulator in a halt state.

2. A control circuit according to claim 1, wherein, after a predetermined light-load transition period has elapsed, after putting the linear regulator in an operating state, the selector circuit puts the step down switching regulator in a halt state.

3. A control circuit according to claim 1, wherein the predetermined state is a state in which the error voltage is larger than a predetermined second threshold voltage.

4. A control circuit according to claim 3, wherein the selector circuit comprises:
a comparator, which compares the error voltage and the second threshold voltage; and
a time measurement circuit, which measures time at which an output signal of the comparator has a predetermined level;
and when the time measured by the time measurement circuit reaches the determination period, the linear regulator is put in an operating state, and the step down switching regulator is put in a halt state.

5. A control circuit according to claim 4, wherein the time measurement circuit comprises a digital filter in which the determination period is set as a time constant.

6. A control circuit according to claim 1, wherein the selector circuit further comprises a current monitoring circuit, which monitors output current of the linear regulator, and when the output current exceeds a predetermined threshold current, puts the step down switching regulator in an operating state, and puts the linear regulator in a halt state.

7. A control circuit according to claim 6, wherein, after a predetermined heavy-load transition period has elapsed, after putting the step down switching regulator in an operating state, the current monitoring circuit puts the linear regulator in a halt state.

8. A control circuit according to claim 6, wherein the linear regulator comprises:
an output transistor, one end of which is connected to the input terminal, and another end of which is connected to an end of an inductor; and
an error amplifier, to which the output voltage and the reference voltage are inputted, and whose output is connected to a control terminal of the output transistor;
and the current monitoring circuit comprises:
a sensing transistor connected commonly with the control terminal to the output transistor;
a sensing resistor arranged on an electrical current path of the sensing transistor; and
a comparator, which compares a voltage drop across the sensing resistor and a predetermined third threshold voltage corresponding to the threshold current.

9. A control circuit according to claim 1, wherein the control circuit is integrated on a single semiconductor substrate.

10. A power supply apparatus comprising:
a switching regulator output circuit including an output capacitor and an inductor, one end of the output capacitor being grounded, and one end of the inductor being connected to the other end of the output capacitor; and
a control circuit in which a step down switching regulator and a linear regulator can be switched, and which supplies a switching voltage to the switching regulator output circuit, the control circuit comprising:
an output stage, including a switching transistor and a synchronous rectifier transistor connected in series between an input terminal and grounding, which outputs a voltage at a connection point of the two transistors, as the switching voltage, to the switching regulator output circuit;
a pulse width modulator, which generates a pulse width modulation signal with which a duty ratio is controlled so that output voltage of the switching regulator output circuit approaches a predetermined reference voltage;
a compulsory OFF circuit, which monitors the switching voltage, and switches OFF the synchronous rectifier transistor when the switching voltage exceeds a first threshold voltage;
a minimum ON time setting circuit, which receives the pulse width modulation signal, limits the duty ratio of the pulse width modulation signal so that ON time of the switching transistor is longer than a predetermined minimum value;
a driver circuit, which generates a first and a second gate voltage to be applied to a gate terminal of the switching transistor and the synchronous rectifier transistor, based on an output signal of the minimum ON time setting circuit; and
a selector circuit, which monitors an error voltage between the output voltage and the reference voltage of the switching regulator output circuit, and when a predetermined state continues for a predetermined determination period, puts the linear regulator in an operating state, and puts the step down switching regulator in a halt state;
wherein the output voltage of the switching regulator output circuit and an output voltage of the linear regulator are switched and outputted.

11. An electronic device comprising:
a battery, which outputs a battery voltage;
a microcomputer; and
a power supply apparatus which steps down the battery voltage and supplies the microcomputer, the power supply apparatus comprising:
a switching regulator output circuit including an output capacitor and an inductor, one end of the output capacitor being grounded, and one end of the inductor being connected to the other end of the output capacitor; and
a control circuit in which a step down switching regulator and a linear regulator can be switched, and which supplies a switching voltage to the switching regulator output circuit, the control circuit comprising:
an output stage, including a switching transistor and a synchronous rectifier transistor connected in series between an input terminal and grounding, which outputs a voltage at a connection point of the two transistors, as the switching voltage, to the switching regulator output circuit;
a pulse width modulator, which generates a pulse width modulation signal with which a duty ratio is controlled so that output voltage of the switching regulator output circuit approaches a predetermined reference voltage;
a compulsory OFF circuit, which monitors the switching voltage, and switches OFF the synchronous rectifier transistor when the switching voltage exceeds a first threshold voltage;
a minimum ON time setting circuit, which receives the pulse width modulation signal, limits the duty ratio of the pulse width modulation signal so that ON time of the switching transistor is longer than a predetermined minimum value;

a driver circuit, which generates a first and a second gate voltage to be applied to a gate terminal of the switching transistor and the synchronous rectifier transistor, based on an output signal of the minimum ON time setting circuit; and a selector circuit, which monitors an error voltage between the output voltage and the reference voltage of the switching regulator output circuit, and when a predetermined state continues for a predetermined determination period, puts the linear regulator in an operating state, and puts the step down switching regulator in a halt state;

wherein the output voltage of the switching regulator output circuit and an output voltage of the linear regulator are switched and outputted.

* * * * *